Dec. 25, 1956 J. D. TURLAY Re. 24,262

ENGINE MANUFACTURING PROCESS

Original Filed Nov. 19, 1952 2 Sheets-Sheet 1

ENGINE MANUFACTURING PROCESS

Original Filed Nov. 19, 1952 2 Sheets-Sheet 2

INVENTOR

BY

ATTORNEYS

United States Patent Office

Re. 24,262
Reissued Dec. 25, 1956

24,262

ENGINE MANUFACTURING PROCESS

Joseph D. Turlay, Flint, Mich., assignor to General Motors Corporation, Detroit, Mich., a corporation of Delaware Original No. 2,722,049, dated November 1, 1955, Serial No. 321,348, November 19, 1952. Application for reissue March 1, 1956, Serial No. 568,957

10 Claims. (Cl. 29—428)

Matter enclosed in heavy brackets [ ] appears in the original patent but forms no part of this reissue specification; matter printed in italics indicates the additions made by reissue.

This invention relates to internal combustion engines and to a process for manufacturing engines of this type and having different piston displacement.

It has been the practice heretofore when building internal combustion engines of different sizes and horsepower to build the engines either of non-identical parts or if certain identical parts are used then it is customary to disable the smaller engines so that full horsepower cannot be developed. This is generally done by employing restrictions of one kind or another to impair the volumetric efficiency of the smaller engines. This reduces the power but it also impairs the efficiency by decreasing the compression ratio of the smaller engines and is therefore objectionable.

It is proposed to construct engines of different horsepower by changing the displacement in engines, the principal parts of which are identical. It is proposed to construct pistons and cylinders which differ principally in diameter and form thereby changing the displacement to produce engines of different horsepower. It is proposed to use identical crankshafts in such engines of different displacement and to compensate for the difference in weight of the pistons by employing flywheels and fan pulleys on opposite ends of the crankshafts, which are capable of compensating for or counter-balancing the unbalanced weight resulting from the different sizes of pistons employed. It is also proposed to use pistons with differently formed ends to maintain the same compression ratio in the engines of different displacement.

Figure 1:
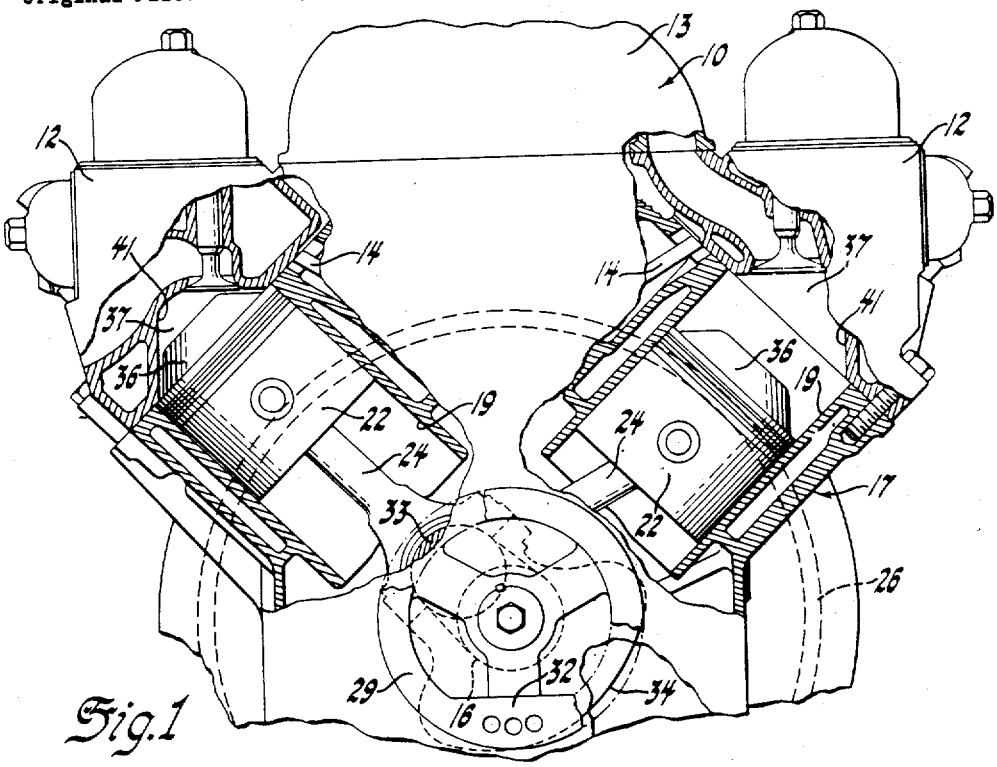
Figure 1 represents a fragmentary end elevational view of an engine of larger displacement and with parts thereof broken away and shown in cross section internally of the engine.
Figure 2:
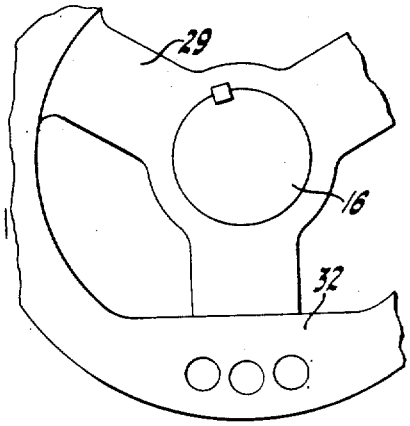
Figure 2 is a fragmentary view of the fan pulley employed on the front end of the engine disclosed by Figure 1.
Figure 3:
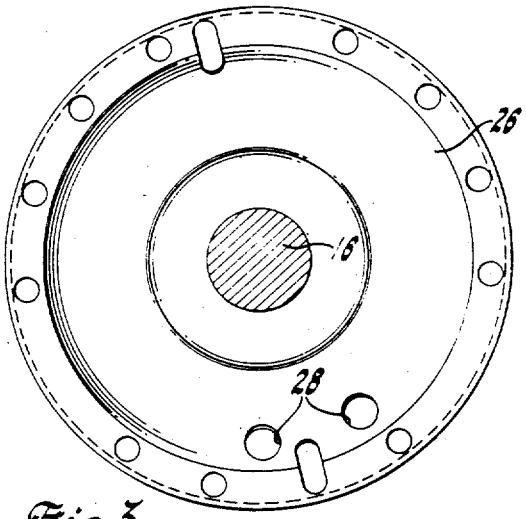
Figure 3 is an elevational view of a flywheel employed on the rear end of the crankshaft with which the engine disclosed by Figure 1 may be provided.
Figure 4:
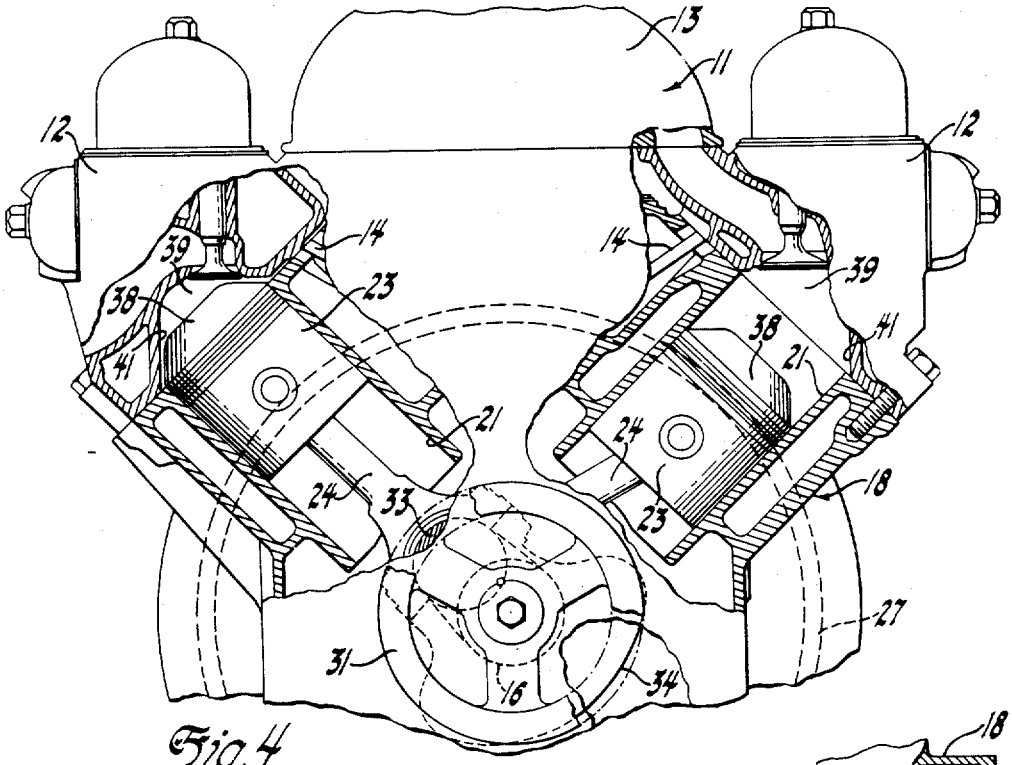
Figure 4 is a view of an engine of smaller displacement and showing parts of the engine structure in cross section.
Figure 5:
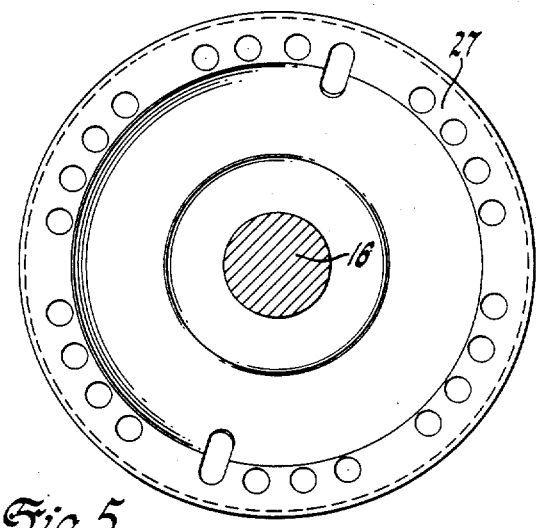
Figure 5 is an elevational view of an engine flywheel which may be employed on the rear end of the crankshaft of the engine disclosed by Figure 4.
Figure 6:
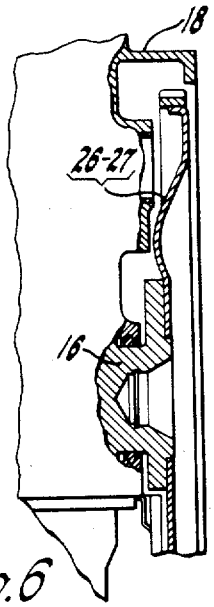
Figure 6 is a fragmentary view illustrating in longitudinal section parts of the crankshafts and the flywheels extending beyond the rear main bearings of the engines disclosed by Figures 1 and 4.

In Figures 1 and 4 V-type internal combustion engines 10 and 11 are constructed in such manner that the engine 10 is of greater displacement and horsepower than the engine 11. However, the engines 10 and 11 may have identical head assemblies 12, identical inlet manifold and carburetor assemblies 13, identical valve actuating mechanisms 14 and identical crankshafts 16. The block 17 for the engine 10 of greater displacement may be identical to the block 18 for the engine 11 of smaller displacement except that the cylinders 19 and 21 may be constructed of different diameters in similar or identical blocks 17 and 18. The cylinders 19 may be made larger in diameter than the cylinders 21 so that larger pistons 22 may be employed in the cylinders 19 and smaller pistons 23 may be employed in the cylinders 21. The cylinders 19 and 21 may be constructed in otherwise identical blocks 17 and 18 either by constructing the wall thickness of the cylinders in the block 18 oversize or by constructing the cylinders of the same wall thickness but of different diameters. If the cylinders 21 in the block 18 are constructed of a wall thickness greater than may be required for the diameter of the cylinders 21 then the cylinders 19 in the block 17 simply may be bored to a larger diameter corresponding to the diameter of the cylinder 19. The pistons 22 and 23 in engines 10 and 11 are all connected to identical crankshafts 16 by identical connecting rods 24. The rear ends of the crankshafts 16 are adapted to have flywheels 26 and 27 secured thereto beyond the rear main bearings of the engines 10 and 11. The flywheels 26 and 27 are identical in every respect except that the flywheels 26 have openings 28 formed on one side thereof which cause the flywheels 26 to be statically and dynamically unbalanced. Except for the openings 28 in the flywheels 26 the flywheels 26 and 27 are statically and dynamically balanced. The front ends of the crankshaft 16 of the engines 10 and 11 are adapted to have secured thereon fan drive pulleys indicated at 29 and 31. The drive pulleys 29 for the engines 10 are statically and dynamically unbalanced to the formation of the pulleys in such manner as to provide unbalanced weights 32 on one side thereof. The drive pulleys 31 are statically and dynamically balanced. The crankshafts 16 are formed in such a way as to provide crank arms 33 which are adapted to be opposed by counterweights 34. The counterweights 34 are formed in such manner as to statically and dynamically balance the crank arms 33, the connecting rods 24 and the pistons 23 for the engines of smaller displacement 11. Since the flywheels 27 and the fan pulleys 31 which are employed on the ends of the crankshafts for the engines 11 are also statically and dynamically balanced it will be apparent that the engines 11 will operate in balance when the crankshafts 16 are rotated by the movement of the pistons 23.

Notwithstanding the fact that identical crankshafts 16 are employed in the engines 10 having pistons 22 that are larger and heavier than the pistons 23 in the engines 11 the engines 10 also will operate in balance when the crankshafts 16 are rotated. The imperfect balance of the crankshafts 16 with the heavier pistons 22 is compensated for by the statically and dynamically unbalanced flywheels 26 at the rear ends of the shafts 16 and the statically and dynamically unbalanced flywheel pulleys 29 at the front ends of the shafts 16. The flywheels 26 and the pulleys 29 are formed with unbalancing means 28 and 32 respectively which is formed and positioned at such angles with respect to the axis of rotation of the shafts 16 as to properly balance the shafts 16 and to compensate for the unbalance resulting from the employment of the shafts with the larger and heavier pistons 22. Since the pistons 22 and 23 in the cylinders 19 and 21 respectively are of different diameters it is nevertheless possible to have the same compression ratios in the engines 10 and engines 11. Such difference in the diameters of the pistons 22 and 23 may be compensated for by forming the outwardly projecting ends 36 on the pistons 22 in such manner as not to project into the combustion chambers 37 in the engines 10 as far as the outwardly projecting ends 38 on the pistons 23 project into the combustion chambers 39 of the engines 11. Such differences in the ends of the pistons 23 and 24 will provide the same compression ratios in the engines 10 and 11 without changing the cavities 41 in the heads of the engines 10 and 11.

By practicing the invention it is possible to build engines of larger displacement and smaller displacement without materially changing any of the parts of the engines other than the pistons employed in the cylinders of the engines and the flywheels and fan pulleys employed on the crankshaft of the engine.

I claim:

1. A process of manufacturing engines of different displacement which comprises constructing identical crankshafts for all of said engines, said crankshafts being statically and dynamically balanced for operation with said engines of smaller displacement *and being statically and dynamically unbalanced for operation with said engines of larger displacement*, constructing flywheels and fan belt pulleys for operation on the rear and front ends of said crankshafts respectively, said flywheels and fan belt pulleys for said engines of smaller displacement being statically and dynamically balanced and said flywheels and fan belt pulleys for said engines of larger displacement being statically and dynamically unbalanced *to the extent necessary to balance said crankshafts for operation with said engines of larger displacement*, and assembling said engines *with the parts thereof in balanced relation and* with said statically and dynamically balanced flywheels and pulleys on said engines of smaller displacement and with said statically and dynamically unbalanced flywheels and pulleys on said crankshafts for said engines of larger displacement.

2. A process of manufacturing engines of larger and smaller displacement and comprising constructing identical crankshafts for said engines of larger and smaller displacement, said crankshafts being statically and dynamically balanced for operation with said engines of smaller displacement, constructing different flywheels and fan belt pulleys for said engines, said flywheels and fan belt pulleys for said engines of smaller displacement being statically and dynamically balanced for operation on said crankshafts without affecting the static and dynamic balance of said crankshafts, said flywheels and pulleys for operation with said engines of larger displacement being statically and dynamically unbalanced and to the extent necessary to compensate for the static and dynamic unbalance of said crankshafts when said crankshafts are employed with said engines of larger displacement, and assembling said engines with said statically and dynamically balanced flywheels and pulleys on said engines of smaller displacement and with said statically and dynamically unbalanced flywheels and pulleys on said engines of larger displacement.

3. A process of manufacturing engines of different displacement which comprises constructing identical engine blocks except with respect to the diameters of the cylinders formed in said blocks, constructing certain of said cylinders with larger diameters for said larger displacement engines and certain of said cylinders with smaller diameters for said smaller displacement engines, constructing pistons of larger diameter for said cylinders of larger diameter and pistons of small diameter for said cylinders of smaller diameter, constructing identical crankshafts for all of said engines, said crankshafts being statically and dynamically balanced for operation in said engines of smaller displacement *and being statically and dynamically unbalanced for operation with said engines of larger displacement*, constructing statically and dynamically balanced engine flywheels and fan pulleys for operation with the crank shafts of said engines of smaller displacement, constructing statically and dynamically unbalanced flywheels and fan pulleys for operation with said engines of larger displacement, *said unbalance of said flywheels and fan pulleys being sufficient to compensate for the unbalance of said crankshafts when employed with said engines of larger displacement*, assembling said engines of smaller displacement *with the parts thereof in balanced relation and* with said pistons of smaller diameters in said cylinders of smaller diameters and said statically and dynamically balanced flywheels and pulleys on the crankshafts of said engines of smaller displacement and assembling said engines of larger displacement *with the parts thereof in balanced relation and* with said pistons of larger diameters in said cylinders of larger diameters and said statically and dynamically unbalanced flywheels and pulleys on the crankshafts of said engines of larger displacement.

4. A process of manufacturing engines of different displacement which comprises constructing all of said engines by employing crankshafts of identical *statically and dynamically balanced* construction, constructing the engines of smaller displacement [with] *by employing said crankshafts in* statically and dynamically balanced crankshaft and piston and connecting rod assemblies, constructing the engines of larger displacement [with] *by employing said crankshafts in* statically and dynamically unbalanced crankshaft and piston and connecting rod assemblies, and balancing said assemblies of said engines of larger displacement by applying unbalanced counterweight means to the crankshafts of said engines of larger displacement.

5. A process of manufacturing engines of different displacement which comprises constructing all of said engines by employing crankshafts of identical *statically and dynamically balanced* construction, constructing the engines of smaller displacement [with] *by employing said crankshafts in* statically and dynamically balanced crankshaft and piston and connecting rod assemblies, constructing the engines of larger displacement [with] *by employing said crankshafts in* statically and dynamically unbalanced crankshaft and piston and connecting rod assemblies and balancing said assemblies of said engines of larger displacement by applying unbalanced counterweight means to the ends of the crankshafts of said engines of larger displacement which project beyond the end bearings for said crankshafts.

*6. A process of manufacturing engines which comprises constructing identical crankshafts for said engines, said crankshafts being statically and dynamically balanced for operation with certain ones of said engines and statically and dynamically unbalanced for operation with certain others of said engines, constructing flywheels and fan belt pulleys for operation on said crankshafts, said flywheels and fan belt pulleys being statically and dynamically balanced for operation on said certain ones of said engines and being statically and dynamically unbalanced for operation on said certain others of said engines, said static and dynamic unbalance of said flywheels and fan belt pulleys being sufficient to compensate for the static and dynamic unbalance of said crankshafts when employed with said certain others of said engines and assembling said engines with said statically and dynamically balanced flywheels and pulleys on said crankshafts for said certain ones of said engines and with said statically and dynamically unbalanced flywheels and pulleys on said crankshafts for said others of said engines.*

*7. A process of manufacturing engines of different displacement and comprising constructing identical crankshafts for all of said engines, said crankshafts being statically and dynamically balanced for operation with the engines of one displacement, constructing different flywheels and fan belt pulleys for said engines of different displacement, said flywheels and fan belt pulleys for said engines of said one displacement being statically and dynamically balanced for operation on said crankshafts without effecting the static and dynamic balance of said crankshafts, said flywheels and pulleys for operation with the engines of another displacement being statically and dynamically unbalanced and to the extent necessary to compensate for the static and dynamic unbalance of said crankshafts when employed with said engines of*

*said another displacement, and assembling said engines with said statically and dynamically balanced flywheels and pulleys on said engines of said one displacement and with said statically and dynamically unbalanced flywheels and pulleys on said engines of said another displacement.*

*8. A process of manufacturing engines of different displacement which comprises constructing identical engine blocks except with respect to the diameters of the cylinders formed in said blocks, constructing the cylinders of certain of said blocks with larger diameters for engines of larger displacement and the cylinders of others of said blocks with smaller diameters for engines of smaller displacement, constructing pistons of larger diameter for said cylinders of larger diameter and pistons of smaller diameter for said cylinders of smaller diameter, constructing identical crankshafts for all of said engines, said crankshafts being statically and dynamically balanced for operation with said engines of one of said displacements and being statically and dynamically unbalanced for operation with said engines of the other of said displacements, constructing statically and dynamically balanced flywheels and fan belt pulleys for operation with said crankshafts for said engines of said one of said displacements, constructing statically and dynamically unbalanced flywheels and fan belt pulleys for operation with said crankshafts for said engines of said other of said displacements, said static and dynamic unbalance of said flywheels and fan belt pulleys being sufficient to compensate for the static and dynamic unbalance of said crankshafts when employed with said engines of said other of said displacements, assembling said engines of said one of said displacements with said pistons and said cylinders and said blocks for said engines of said one of said displacements and said statically and dynamically balanced flywheels and pulleys and said crankshafts, and assembling said engines of said other of said displacements with said pistons and said cylinders and said blocks for said engines of said other of said displacements and said statically and dynamically unbalanced flywheels and pulleys and said crankshafts.*

*9. A process of manufacturing engines of different displacement which comprises constructing all of said engines by employing crankshafts of identical statically and dynamically balanced construction, constructing the engines of one displacement by employing said crankshafts in statically and dynamically balanced crankshaft and piston and connecting rod assemblies, constructing the engines of another displacement by employing said crankshafts in statically and dynamically unbalanced crankshaft and piston and connecting rod assemblies, and balancing said assemblies for said engines of said another displacement by applying unbalanced counterweight means to the crankshafts of said engines.*

*10. A process of manufacturing engines of different displacement which comprises constructing all of said engines by employing crankshafts of identical statically and dynamically balanced construction, constructing the engines of one displacement by employing said crankshafts in statically and dynamically balanced crankshaft and piston and connecting rod assemblies, constructing the engines of another displacement by employing said crankshafts in statically and dynamically unbalanced crankshaft and piston and connecting rod assemblies, and balancing said assemblies of said engines of said another displacement by applying unbalanced counterweight means to the ends of the crankshafts of said engines wihch project beyond the end bearings for said crankshafts.*

References Cited in the file of this patent or the original patent

UNITED STATES PATENTS

| | | |
|---|---|---|
| 1,428,620 | Wilber | Sept. 12, 1922 |
| 1,783,664 | McGovern | Dec. 2, 1930 |
| 2,450,701 | Wahlberg | Oct. 5, 1948 |
| 2,632,340 | Dolza | Mar. 24, 1953 |